United States Patent
Edstam

(12) 
(10) Patent No.: US 6,718,175 B1
(45) Date of Patent: Apr. 6, 2004

(54) METHOD AND A SYSTEM RELATING TO A MOBILE COMMUNICATION DEVICE

(75) Inventor: Anders Daniel Edstam, Märsta (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 227 days.

(21) Appl. No.: 09/588,461

(22) Filed: Jun. 6, 2000

(30) Foreign Application Priority Data

Jun. 8, 1999 (SE) .............................................. 9902137

(51) Int. Cl.[7] .................................................. H04Q 7/20
(52) U.S. Cl. ................................ 455/456.5; 455/456.6; 455/88
(58) Field of Search .......................... 455/456, 88, 450, 455/433, 435, 456.3, 456.4, 456.5, 456.6

(56) References Cited

U.S. PATENT DOCUMENTS

| | | | |
|---|---|---|---|
| 5,224,150 A | * 6/1993 | Neustein | 379/157 |
| 5,442,805 A | * 8/1995 | Sagers et al. | 342/457 |
| 5,774,787 A | * 6/1998 | Leopold et al. | 455/12.1 |
| 5,794,147 A | * 8/1998 | Huang | 375/216 |
| 6,085,096 A | * 7/2000 | Nakamura | 455/456 |
| 6,128,485 A | * 10/2000 | Mori et al. | 455/422 |
| 6,163,695 A | * 12/2000 | Takemura | 455/422 |
| 6,201,973 B1 | * 3/2001 | Kowaguchi | 342/357.05 |
| 6,222,458 B1 | * 4/2001 | Harris | 340/686.6 |
| 6,393,254 B1 | * 5/2002 | Pousada Carballo et al. | 455/1 |
| 6,496,703 B1 | * 12/2002 | da Silva | 455/456 |
| 6,584,319 B1 | * 6/2003 | Girod | 455/456 |
| 6,625,455 B1 | * 9/2003 | Ariga | 455/456 |

FOREIGN PATENT DOCUMENTS

| | | | |
|---|---|---|---|
| EP | 0 881 851 A1 | * 2/1998 | H04Q/7/38 |
| GB | 2 317 304 A | 3/1998 | |
| WO | 98/31168 | 7/1998 | |

OTHER PUBLICATIONS

PCT WO 99/55102 Oct. 28, 1999 TE–ENI, Ben.*

* cited by examiner

Primary Examiner—Nay Maung
Assistant Examiner—Edan Orgad
(74) Attorney, Agent, or Firm—Nixon & Vanderhye P.C.

(57) ABSTRACT

In a stand-alone device arranged to transmit messages to mobile communication devices, the massages are transmitted without affecting the normal communication in the mobile communication networks. The system can be located at any suitable location where mobile telephone communication is not desired. The system is arranged to transfer a predefined message in form of text or voice to the mobile communications device. This is obtained in that the system is designed to detect and force the mobile to lock on to a control channel of the system. Thereafter the system transmits a predefined text or voice message to the mobile telephony device users within the coverage area of the system. An application area is to prevent mobile telephony device users to have the device switched on in radiosensitive areas such as hospitals and aeroplanes. The device could also suitably be located in libraries, churches and theatres where ring signals and conversation is of disturbing nature.

16 Claims, 3 Drawing Sheets

METHOD AND A SYSTEM RELATING TO A MOBILE COMMUNICATION DEVICE

TECHNICAL FIELD

The present invention relates to a method and a system for minimizing the use of mobile telephones in certain areas.

BACKGROUND OF THE INVENTION AND PRIOR ART

Today mobile telephones are becoming more and more frequent. The use of mobile telephones has in many regards facilitated the daily life for many people. However, in some places the use of mobile telephones is not appreciated and in some places even prohibited. Thus, mobile telephones are not liked in restaurants, libraries, churches etc.

Therefore, there is a need for a mobile telephone system, which minimizes or completely removes the possibility to use a mobile telephone in certain restricted areas.

In order to solve this problem a number of different solutions have been proposed. Thus, the international patent application WO 97/49255 discloses a method for eliminating the disturbance caused by a mobile station located in a certain area. The mobile station is provided with a control means, which mutes the mobile station upon receiving a particular message transmitted from a transmitting means provided in the certain area.

In the European patent application EP-0,880,296 a transmission restricting system is disclosed. The system comprises means for generating and radiating a magnetic field pattern, which includes a command signal, which commands a transmission interruption to a radio communication terminal.

However, the solutions provided according to WO 97/49255 and EP-0,880,296 both require additional hardware to be installed in existing mobile telephones. This is of course a drawback, since in order to work properly all existing mobile telephones would have to redesigned or exchanged.

In the UK patent application GB 2,317,304 another solution to the problem is disclosed. According to the system disclosed in GB 2,317,304 a base station in a mobile telecommunication network is provided with a message transmission function which is installed near the place where use of a mobile telephone is restricted. When a mobile unit enters the area managed by the base station having the message transmission function, a message is transmitted from the base station to the mobile unit instructing the mobile unit to turn off a power supply for the mobile unit.

However, even though not requiring additional hardware in the mobile telephones, the system as described in GB 2,317,304 does not provide an optimal solution. Thus, a base station is expensive and hence the system described in GB 2,317,304 will be expensive and also the location of the base stations must be chosen so that the area covered by the base station corresponds to the restricted area, which location probably will not be the optimal location for the radio system as a whole and a part of which is formed by the base station having the message function.

SUMMARY

It is an object of the present invention to provide a method and a system, which reduces or eliminates the use of mobile telephones in restricted areas, and which at the same time does not require any change in the hardware of the mobile telephones or the existing mobile telephone network and which is inexpensive to implement and does not affect the planning of a radio system, such as the location of radio base stations.

This object and others are obtained by a system comprising a stand-alone device arranged to force a mobile station or telephone entering a restricted area to register in the system. The device issues a message to the mobile telephone instructing the user to turn off the telephone, when the mobile telephone enters the coverage area of the device.

Thus, a system is provided, which is arranged to transmit messages to mobile communication devices, without affecting the normal communication in the mobile communication networks. The system is implemented as a stand alone device, which can be located at any suitable location where mobile telephone communication is not desired, even in location where there is no coverage by mobile telecommunication networks.

Such a standalone system is preferably able to transfer a predefined message in text or voice format to the mobile communications device. This is obtained in that the system is designed to detect and force the mobile station to lock on to a control channel of the system. Thereafter the system transmits a predefined text or voice message to the mobile telephony device users within the coverage area of the stand-alone system.

An application area is to prevent mobile telephony device users to have the device switched on in radiosensitive areas such as hospitals and aeroplanes. The device could also suitably be located in libraries, churches and theatres where ring signals and conversation is of disturbing nature. Another possible application would be to deliver warnings about special conditions in certain areas. That could be useful in areas where an accident in a rural area not covered by the PLMNs to make people aware of an accident. The system can be mounted on an emergency vehicle. It can also be used for transmitting adverts locally in a shopping mall.

Since the stand-alone device is not required to be connected to a mobile telephone system it is easy to move around and in-expensive to manufacture.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1:
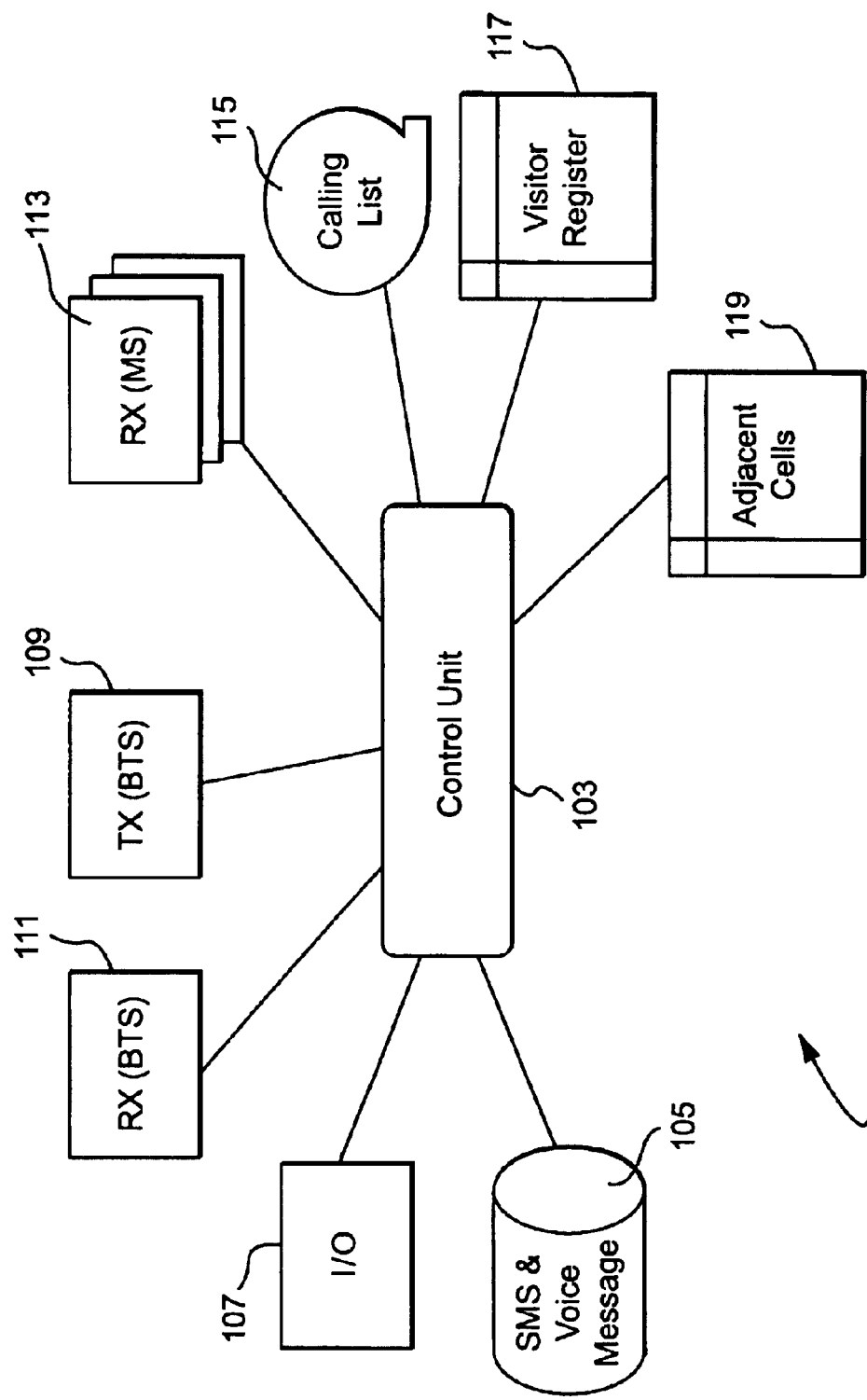
FIG. 1 is a general view of a system for handling mobile stations in a restricted area.

In FIG. 1 a general view of a stand-alone device (ASE) 101 for handling mobile stations in a restricted area and for reducing the disturbance thereof in the restricted area is shown. The device 101 comprises a control unit 103. The control unit 103 is connected to a short message service (SMS) unit 105 and also to an input/output (I/O)-device 107.

Furthermore, the control unit 103 is connected to a transmitting part (TX) 109 and a receiving part (RX) 111 of a base station (BTS). Also, the device 101 comprises receiving units 113 for receiving information from adjacent cells 119. The device 101 further comprises a calling list/register 115 and a visitor register 117.

All messages and parameter settings used in the disturbance reducing system are easily accessed and changeable through the I/O device 107. The I/O device can possibly be accessed through a simple serial port for connection to a computer or be reached via an air-interface. A registered owner of the system can access the system with a call from a normal mobile to change, add or delete messages to be sent within the area covered by the disturbance reducing system.

Figure 2:
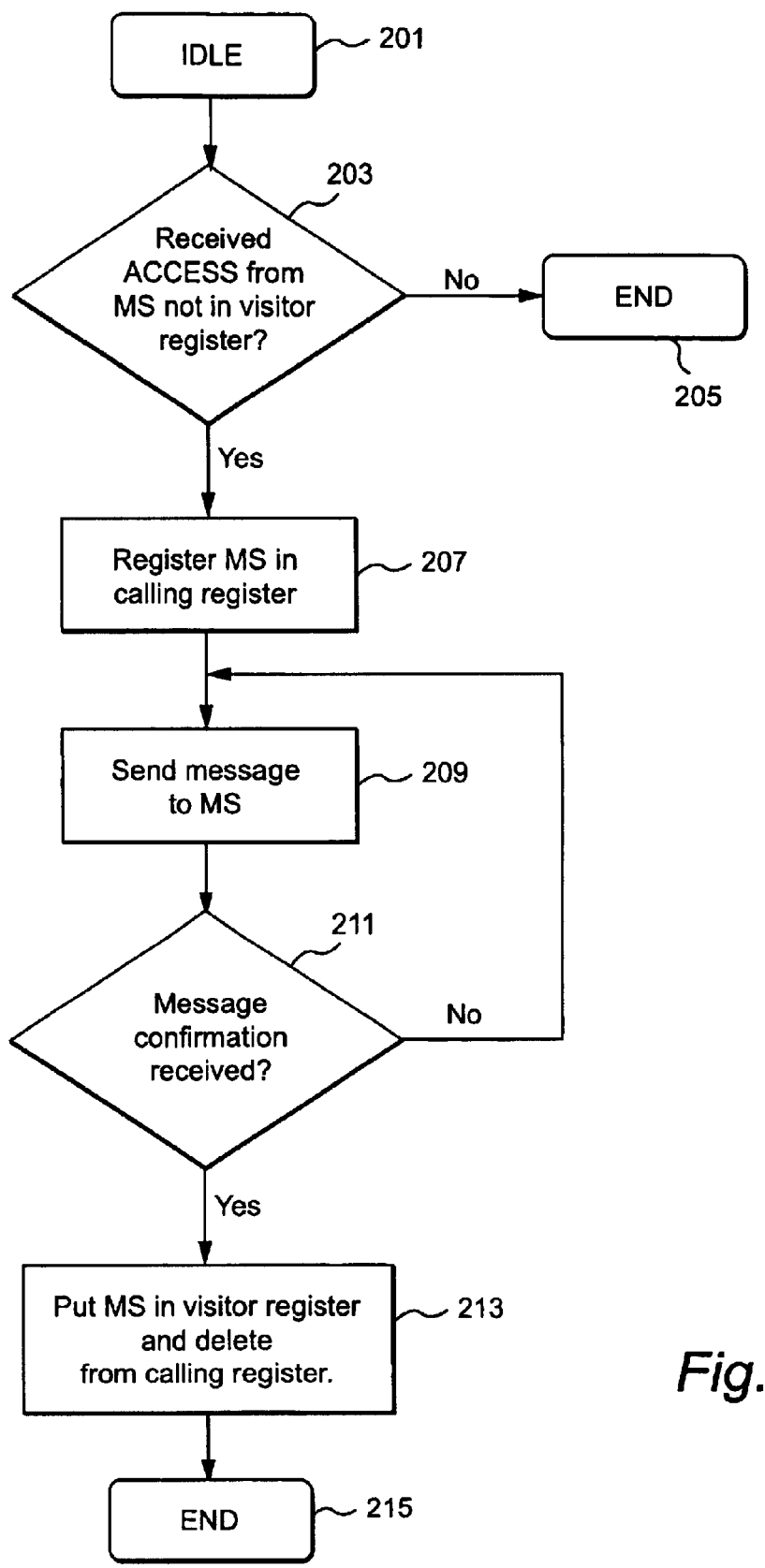
FIG. 2 is a flow chart illustrating different steps carried out in a system when a mobile station enters a restricted area.

In FIG. 2, a flow chart illustrating different steps carried out in a procedure in the ASE device 101 when a mobile station enters a restricted area. The procedure illustrated in FIG. 2 assumes that the device 101 is designed for a GSM system. Thus, initially the system is idle, block 201.

Thereupon, in a block 203 it is checked if the system has received an access demand on the control channel of the GSM-system from a mobile station not already registered in the visitor register. If this is not the case the procedure ends in a block 205. The procedure is then restarted at some suitable time.

If, on the other hand, an access demand has been received from a mobile station when the checking in the block 203 is performed, the procedure proceeds to a block 207. In the block 207, the mobile station which has demanded access is registered in a calling register. The calling register is a register where mobile stations are initially placed when entering an area covered by the system shown in FIG. 1. I.e. when the mobile station enters an area where the device 101 is in control of the control channel of the GSM-system.

Thereupon, the procedure proceeds to a block 209, wherein a message, preferably an SMS format message, is transmitted to the mobile station, which has demanded access. The message comprises an instruction to the user of the mobile station that he/she now is entering a restricted area. For example a message "you are now entering a hospital, please turn off your telephone" or "you are now boarding an aircraft, please turn off your telephone" can be transmitted to the mobile station.

Next, in a block 211, it is checked if the mobile station has confirmed the reception of the message transmitted in block 209. If this is not the case the procedure returns to the block 209 where the message is retransmitted.

If, on the other hand, a message confirmation is received in the block 211 the procedure proceeds to a block 213. When the system successfully has received the confirmation message, the International Mobile Subscriber Identity (IMSI) should preferably be stored for a predefined time in the visitor register to prohibit the device from sending the message again during that time.

In the block 213, the mobile station is placed in the visitor register of the system and is also deleted from the calling register thereof. The procedure then ends in a block 215.

Figure 3:
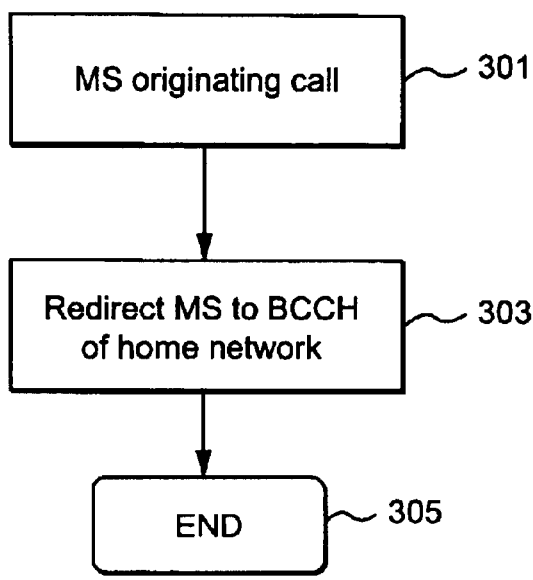
FIG. 3 is a flow chart illustrating the steps carried out when a mobile station sets up a call in an area covered by the system shown in FIG. 1.

When a mobile station is about to set up a call in the area covered by a disturbance reducing system, such as the system shown in FIG. 1, the mobile station is directed back to the home network. This procedure is illustrated in FIG. 3. Thus, first in a block 301 a mobile station, such as a mobile telephone, which is located in a restricted area covered by a system as depicted in FIG. 1, wants to set up a call.

The system then redirects the call set up from the mobile station to the Broadcast control channel (BCCH) of the home network in a block 303, i.e. the network to which the mobile station belongs. The call can then be set up as usual and the procedure ends in a block 305.

Figure 4:
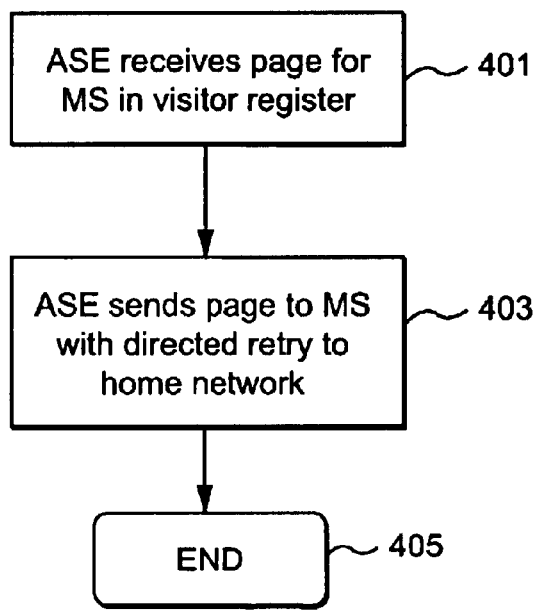
FIG. 4 is a flow chart illustrating the steps carried out when a mobile station which is located inside an area covered by the system in FIG. 1 is paged.

In FIG. 4, a flow chart of the steps carried out when paging a mobile station located in an area covered by the system shown in FIG. 1 is shown. Thus, first the system receives a paging signal for a mobile station, which is located in the visitor register of the system, step 401. The system then sends a message to the mobile station informing the mobile station that an incoming call is waiting, step 403. The procedure then ends in a step 405.

In another preferred embodiment the system is equipped with a filter which prevents forwarding of paging signals to the mobile station and/or which prevents the forwarding of a call set-up signal for as long as the mobile station is located inside the area covered by the system 101.

Such a function can be useful in an environment where it is likely that mobile station users would not respect the message transmitted by the system to turn of the mobile station. If such a filter function is provided there is no use in not turning off the mobile station, since it cannot be used anyway. However, the filter can be designed to let SOS calls through, such as "112" in Europe and "911" in the United States of America, provided that the stand-alone device 101 is located in an area covered by at least one PLMN.

In yet another preferred embodiment the system is provided with an Adaptive Frequency Allocation (AFA) function. Thus, when the system is provided with receivers 113 for listening to the traffic in adjacent cells, the system can determine which channels that are currently used in the adjacent cells. The system then chooses the most suitable channel-pattern to use, i.e. the pattern which gives the least interference levels to the neighbouring cells within the existing systems.

Preferably, the disturbance reducing system contains a memory device for text and voice messages. The disturbance reducing system is preferably also listening to the BCCH of the neighbouring cells and is able to forward a page signal to the mobile stations and direct it to the neighbouring cell which belongs to the MS home PLMN.

An application for the system as described herein could be to prevent mobile telephony device users to have the device switched on in radiosensitive areas such as hospitals and aeroplanes. The device could be suited in libraries, churches and theatres where ring-signals and conversation is of disturbing nature. Another possible application would be to deliver warnings about special conditions in certain areas. That could be useful in areas where an accident in a rural area not covered by the PLMN'S to make people aware of an accident. Imagine an ASE mounted on an emergency vehicle. It can also be used for transmitting adverts locally in a shopping mall.

What is claimed is:

1. A stand-alone device for reducing the disturbance of a mobile station located in a restricted area covered by the device, comprising:

means for making the mobile station register with the stand-alone device when the mobile station enters the restricted area, and means for transmitting a message to the mobile station from the stand-alone device, which message comprises a request to the user of the mobile station to turn off the power supply to the mobile station, wherein the stand-alone device is separate from any mobile communication network.

2. A device according to claim 1, further comprising means for checking if the mobile station has confirmed the reception of the transmitted message, and means for retransmitting the message if the mobile station has not confirmed the reception of the message.

3. A device according to claim 1, further comprising a calling register for storing an identity of the mobile station when the mobile station has registered in the stand-alone device.

4. A device according to claim 1, further comprising a visiting register for storing an identity of the mobile station when the mobile station has confirmed the reception of the message.

5. A device according to claim 1, further comprising a filter unit arranged to intercept transmission of signals to and/or from a mobile station located in the area covered by the stand-alone device.

6. A device according to claim 1, wherein the stand-alone device is arranged to control the control channel of a mobile network in order to make the mobile station register in the area covered by the stand-alone device.

7. A device according to claim 1, when the mobile station is a GSM mobile station, wherein the message transmitted to the mobile station is an SMS-message.

8. A device according to claim 4, further comprising means for receiving a paging signal for a mobile station having an identity stored in the visiting register, and means for sending a message to the mobile station indicating that an incoming call is waiting.

9. A method of reducing the disturbance of a mobile station, which mobile station is located in a restricted area, the method comprising:

first forcing the mobile station to register in a disturbance reducing stand-alone device covering at least a part of the restricted area when the mobile station enters the coverage area of the stand-alone device, the device being separate from any mobile communication network, and transmitting a message to the mobile station, the message comprising a request to the user of the mobile station to turn off the power supply of the mobile station.

10. A method according to claim 9, further comprising checking if the mobile station has confirmed the reception of the message, and retransmitting the message if the mobile station has not confirmed the reception of the message.

11. A method according to claim 9, further comprising storing an identity of the mobile station in a calling register when the mobile station has registered in the stand-alone device.

12. A method according to claim 9, further comprising storing the identity of the mobile station in a visitor register when the mobile station has confirmed the reception of the message.

13. A method according to claim 9, wherein any transmission to and/or from the mobile station is intercepted by the stand-alone device when the mobile station is located in the area covered by the stand-alone device.

14. A method according to claim 9, wherein the stand-alone device is arranged to control the control channel of a mobile network in order to make the mobile station register in the area covered by the stand-alone device.

15. A method according to claim 9, when the mobile station is a GSM mobile station, wherein the stand-alone device transmits messages to the mobile station in an SMS-message format.

16. A method according to claim 12, further comprising receiving a paging signal for a mobile station having an identity stored in the visiting register, and sending a message to the mobile station indicating that an incoming call is waiting.

* * * * *